Patented Aug. 24, 1954

2,687,409

UNITED STATES PATENT OFFICE 2,687,409

LIQUEFACTION AND STABILIZATION OF PINE-RESIN

Albert Canouet, Le Bouscat-Bordeaux, France, assignor to Vitex S. A. Anciens Etablissements J. Canouet, Le Bouscat-Bordeaux (Gironde), France No Drawing. Application January 24, 1951, Serial No. 207,661

Claims priority, application France April 3, 1950

4 Claims. (Cl. 260—109)

Pine-resin flows out in the liquid state from cuts made in resinous trees, but it is not long before the resin acids contained in it crystallize and its appearance is then that of a thick, honey-like mass, difficult to handle.

During the time the pine-resin remains in the collecting pots suspended from the tree trunks, the resin becomes fouled with many impurities: various vegetable debris, sand, and water trickling down the trunks.

It is important to purify it prior to treatment, by melting it, then subjecting it to a filtering and settling step. Unfortunately, the resin re-crystallizes rapidly, even when diluted in an additional quantity of turpentine to make up a total of 35% of oil, and again becomes difficult to handle.

To avoid these difficulties in handling, one of the following procedures is generally used, either the resin must be used as soon as purified, but inasmuch as the crop of resin is seasonal the treating plant would not be able to operate the year around unless by storing the resin in its raw state, which offers drawbacks in the possibility of discoloration and decomposition:

Or the resin must be stored at a temperature of from 50 to 70° C. but at such temperatures oxidation is more rapid and the resin acids isomerize;

Or the resin which has been allowed to crystallize should be re-melted, but handling difficulties here again are too great;

Or lastly the balsam obtained by hot de-hydration of the resin may be fluidized, but this process when applied with ordinary solvents such as turpentine oil, requires such amounts of the solvents as to be industrially inapplicable.

Now, it has been found that a preliminary de-hydrated pine-resin may be fluidized and caused to retain its stable fluid condition by the use of small amounts of an alcohol of low molecular weight such as methanol or ethanol.

The invention is accordingly concerned with a method of stably fluidizing pine-resin, which comprises a combination of the following successive steps:

Said pine-resin is first de-hydrated in order to provide maximum solvent concentration. Then small amounts of low-molecular weight alcohols are added to it as stabilizing and fluidizing solvents.

The initial de-hydration may be effected by simply heating at normal pressure or in vacuo in a boiler provided with an agitator and a distilling device allowing the oil of turpentine to be separated, if necessary, from the water carried with it.

According to the invention, the presence of this oil, while favourable to the desired solubilization and stabilization, is in no way essential.

When this de-hydration is deemed to have proceeded sufficiently, this requiring on an average from 15 to 20 minutes, small amounts of the low molecular-weight alcohol are added. It is found that With 1% methanol the viscosity is reduced by about 95%;

With 1% ethanol, the viscosity is reduced by about 75%; and

With 5% ethanol, the viscosity is reduced by about 99%.

The main advantage of the method of the invention is that it allows the pine-resin to be handled by pumping in all seasons and thus facilitates its treatment.

The invention will be well understood from the ensuing examples which have no restrictive character.

*1st example.*—A filtered American resin containing 20% oil of turpentine is slowly heated to 90–100° C. in a low vacuum within a boiler provided with an agitator and a distilling device with continuous separation of the carried-over water by a Florentine vessel, while the oil of turpentine is recycled to the apparatus.

The resin is stripped of its water in from 15 to 20 minutes and then appears in the form of a viscous balsam.

Instead of recycling the turpentine oil into the boiler, it may be replaced by another and less expensive solvent, such as a turpentine substitute. The de-hydrated resin has a viscosity of 3,600 poise at 20° C., which means that it is not fluid enough to be poured from a container at a temperature of 10–15° C.

If any of the previously-defined alcohols are added to the resin, a more fluid solution is obtained. Thus, with 1% methanol, a viscosity of 180 poise is obtained; with 1% ethanol, a 907 poise viscosity is obtained, and with 5% ethanol, 29 poise viscosity is obtained.

Even when stored at a temperature below 0° C., the resin thus treated shows no tendency towards re-crystallization.

*2nd example.*—A filtered French pine-resin containing 15% of turpentine is caused to flow continuously downwards through a vertical tube filled with Raschig rings, externally heated to 100–160° C. depending on the rate of flow. The water and part of the turpentine distill from the apparatus and are condensed in a cooler. The water, which also contains other volatile organic products, is separated; the oil is mixed back into the de-hydrated resin which flows out of the base of the apparatus.

After this treatment, the resin, which is nearly solid, is mixed with 1 to 10% (preferably 2%) ethyl alcohol to restore it to the liquid state.

The following viscosity values have been observed:

| | |
|---|---|
| De-hydrated resin | Pastelike. |
| 5% ethanol added | 56 poise. |
| 1% methanol added | 900 poise. |
| 5% methanol added | 305 poise. |

What I claim is:

1. A method of treating a pine-resin normally fluid when fresh to preserve its fluidity for an extended period of time which comprises, dehydrating said resin to produce a fresh balsam of relatively high viscosity, and adding to said freshly-dehydrated balsam a small but effective amount of a low molecular weight monohydric alcohol insufficient to dissolve said balsam but sufficient to form a fluid, stable resin product exhibiting substantially unchanged fluidity on storage.

2. A method as defined in claim 1 wherein said alcohol is employed in an amount within the range of 1 to 10% by weight.

3. A method of treating a pine-resin normally fluid when fresh to preserve its fluidity for an extended period of time which comprises dehydrating said resin to produce a balsam of relatively high viscosity and adding to said freshly-dehydrated balsam a small but effective amount of a low molecular weight monohydric alcohol selected from the group consisting of methanol and ethanol insufficient to dissolve said balsam but sufficient to form a fluid, stable resin product exhibiting substantially unchanged fluidity on storage.

4. A method as defined in claim 3, wherein said alcohol is added in an amount within the range of 1 to 10% by weight.

References Cited in the file of this patent

UNITED STATES PATENTS

| Number | Name | Date |
|---|---|---|
| 2,086,777 | Palkin et al. | July 13, 1937 |
| 2,093,348 | Carpzow | Sept. 14, 1937 |